United States Patent
Arbeiter (10) Patent No.: US 7,185,447 B2
(45) Date of Patent: Mar. 6, 2007

(54) DRYING DEVICE FOR DRYING A GAS

(76) Inventor: Peter Arbeiter, Arlbergstrasse 103, A-6900 Bregenz (AT)

( * ) Notice: Subject to any disclaimer, the term of this patent is extended or adjusted under 35 U.S.C. 154(b) by 136 days.

(21) Appl. No.: 11/111,563

(22) Filed: Apr. 20, 2005

(65) Prior Publication Data

US 2005/0241178 A1    Nov. 3, 2005

(30) Foreign Application Priority Data

Apr. 29, 2004 (AT) .............................. A 745/2004

(51) Int. Cl.
*F26B 3/00*    (2006.01)

(52) U.S. Cl. .................. 34/471; 34/75; 34/79; 95/123; 96/127; 62/196.3

(58) Field of Classification Search ................. 34/468, 34/469, 471, 75, 79; 95/115, 123; 96/115, 96/123; 62/169.3
See application file for complete search history.

(56) References Cited

U.S. PATENT DOCUMENTS

| | | | | |
|---|---|---|---|---|
| 2,747,681 | A | * | 5/1956 | Schuftan et al. ............... 96/122 |
| 2,753,950 | A | * | 7/1956 | Baker et al. ................... 96/115 |
| 3,568,406 | A | * | 3/1971 | Dynes ........................... 95/115 |
| 3,850,592 | A | * | 11/1974 | Huffman ...................... 95/123 |
| 4,661,128 | A | * | 4/1987 | Bachhofer et al. ............ 96/127 |
| 6,393,850 | B1 | * | 5/2002 | Vanderstraeten ........... 62/196.3 |
| 6,442,951 | B1 | * | 9/2002 | Maeda et al. ................... 62/94 |
| 6,581,394 | B1 | * | 6/2003 | Smolenskiy .................. 62/172 |
| 6,979,362 | B2 | * | 12/2005 | Jackson ........................ 96/218 |
| 2005/0198981 | A1 | * | 9/2005 | Arno ............................ 62/229 |
| 2006/0201167 | A1 | * | 9/2006 | Bellemo ......................... 62/93 |

FOREIGN PATENT DOCUMENTS

| | | |
|---|---|---|
| DE | 32 26 502 | 2/1983 |
| DE | 40 22 802 | 1/1992 |
| DE | 198 08 011 | 2/2000 |
| EP | 0 626 191 | 11/1994 |

* cited by examiner

*Primary Examiner*—S. Gravini
(74) *Attorney, Agent, or Firm*—Reed Smith LLP (57) ABSTRACT

A drying device for drying a gas comprises parallel cooling branches, at least one of which is in its active state at any given time. A gas-coolant heat exchanger arranged in each of the cooling branches has a first channel through which the gas to be dried flows in the active state of this cooling branch and a second channel which, in the active state of this cooling branch, forms an evaporator for a coolant circulating in at least one coolant circuit. The drying device further comprises an ambient-air input line, an ambient-air output line and an ambient-air conveyor. In the passive state of a respective cooling branch, the ambient-air input line and the ambient-air output line are connected, at least for a time, with this cooling branch by the switching device and the ambient-air conveyor conveys ambient air through the first channel of the gas-coolant heat exchanger arranged in this cooling branch.

19 Claims, 4 Drawing Sheets

DRYING DEVICE FOR DRYING A GAS

CROSS-REFERENCE TO RELATED APPLICATION

This application claims priority of Austrian Application No. A 745/2004, filed Apr. 29, 2005, the complete disclosures of which are hereby incorporated by reference.

BACKGROUND OF THE INVENTION a) Field of the Invention

The invention is directed to a drying device for drying a gas, particularly a gas that is guided in a circuit through a drying vessel of a drying plant, which drying vessel receives material to be dried, with a gas input line for supplying the gas to be dried and with a gas output line for discharging the dried gas, and with parallel cooling branches which can be switched by a switching device between an active state, in which the gas to be dried flows through the cooling branch and cold-drying of the gas is carried out in the cooling branch, and a passive state, wherein at least one of the cooling branches is in its active state at a given time, and wherein a gas-coolant heat exchanger arranged in each of the cooling branches has a first channel through which the gas to be dried flows in the active state of this cooling branch and a second channel which, in the active state of this cooling branch, forms an evaporator for a coolant circulating in at least one coolant circuit.

b) Description of the Related Art

Drying devices for drying a gas, in particular air, are used, for example, in connection with plants for drying bulk material such as plastic granulate. After a certain storage period or after production, bulk material of this kind can have too much moisture for processing, e.g., in extruders or injection molding machines, particularly when it is hydroscopic. The bulk material must then be dried before processing. Drying plants with closed circuits for the drying air are already known for this purpose. A drying plant of this kind is known, for example, from EP 626 191 A1. Air is guided by means of a conveyor device through an adsorption dryer and is then heated and blown into the bulk material vessel. After flowing through the bulk material, the air is fed to the input side of the conveyor device. After a certain operating time, the adsorbent medium of the adsorption dryer is saturated with moisture so that the desired dew point of the air, e.g., −40° C., is no longer reached after the air flows through the adsorbent medium. A regeneration cycle must then be carried out. For this purpose, the conveying direction of the conveyor device is reversed and ambient air is heated and guided through the adsorbent medium so that the adsorbent medium is regenerated by the hot air. This drying plant is disadvantageous due to the required servicing because the adsorbent material must constantly be changed in a time-consuming manner and the total energy consumption of the device is still relatively high.

Another drying device for drying a gas, in particular air, in the form of an adsorption dryer is disclosed in DE 32 26 502 A1 in which the adsorbent medium is additionally cooled in order to increase the moisture absorbing capacity of the adsorbent medium.

In another type of known drying plant for bulk material, dried compressed air is supplied through a compressed-air line. A pressure reduction valve reduces the pressure of the supplied compressed air to a preset value. The air is heated to the desired temperature by a heating device and subsequently flows into the bulk material vessel in the vicinity of its take-off opening. After flowing through the bulk material, the moisture-laden air flows through an exhaust outlet. In order to dry the dried compressed air that is supplied, the compressed air is usually guided through a molecular sieve dryer, after which its dew point is in the range of −40° C. to −50° C., for example. For pre-drying the compressed air, the latter can be dried initially to a dew point temperature of 3° C. by a commercially available cold dryer before flowing through the molecular sieve dryer, wherein condensation will occur. Accordingly, the compressed air supplied to the molecular sieve dryer has a dew point of 3° C. The regular servicing of the compressed-air compressor and the high energy consumption are disadvantageous in this drying plant.

A device of the type mentioned in the beginning is known from DE 198 08 011 C1. This device for cold-drying of the gas to be dried has two parallel branches through which the gas is guided in opposing cycles and cold-dried. The branch through which the gas is not currently guided is regenerated and ice deposits are thawed and removed. For this purpose, a partial flow of the hot gas supplied to the drying device is branched off from the main flow before the gas is cooled and is guided through the currently passive cooling branch. This partial flow is then fed, together with the main flow, to the other cooling branch. Among the disadvantages in this device is the fact that the additional moisture absorbed by the partial flow in the passive cooling branch leads to a faster icing of the active cooling branch so that more frequent switching processes are required between the branches. This decreases the overall efficiency of the plant.

OBJECT AND SUMMARY OF THE INVENTION

An important object of the invention is to provide a drying device of the type mentioned in the beginning which means of which a low dew point temperature of the dried gas and a low energy consumption can be achieved.

This object is met, according to the invention, by a drying device comprising a gas input line for supplying the gas to be dried, a gas output line for discharging the dried gas, parallel cooling branches which can be switched by a switching device between an active state, in which the gas to be dried flows through the cooling branch and cold-drying of the gas is carried out in the cooling branch, and a passive state, wherein at least one of the cooling branches is in its active state at a given time, and wherein a gas-coolant heat exchanger arranged in each of the cooling branches has a first channel through which the gas to be dried flows in the active state of this cooling branch and a second channel which, in the active state of this cooling branch, forms an evaporator for a coolant circulating in at least one coolant circuit, and an ambient-air input line, an ambient-air output line and an ambient-air conveyor, wherein in the passive state of a respective cooling branch the ambient-air input line and the ambient-air output line are connected at least some of the time with this cooling branch by means of the switching device and the ambient-air conveyor conveys ambient air through the first channel of the gas-coolant heat exchanger arranged in this cooling branch.

By means of the air conveyor for ambient air, by which the ambient air can be conveyed via the ambient-air input line through a respective cooling branch in its passive state and flows out through the ambient-air output line after flowing through the cooling branch, the respective passive cooling branch can be thawed and regenerated in a simple manner.

In an advantageous embodiment form of the invention, at least one gas-gas heat exchanger is arranged in the cooling branches and has a first channel through which the gas to be dried is guided before being guided through the first channel of the gas-coolant heat exchanger and a second channel through which the gas to be dried is guided after being guided through the first channel of the gas-coolant heat exchanger.

Further, the drying device preferably comprises at least one gas-gas heat exchanger having a first channel through which the gas to be dried is guided before being guided through one of the cooling branches and a second channel through which the gas to be dried is guided after being guided through one of the cooling branches. In this way, a highly energy-saving drying device can be provided.

In an advantageous embodiment form of the invention, in the passive state of a respective cooling branch, the second channel of the gas-coolant heat exchanger of this cooling branch, at least for a time, forms a condenser for the coolant circulating in the coolant circuit. A particularly efficient regeneration of the passive cooling branch is achieved in this way.

A drying device, according to the invention, can be constructed so as to be robust, durable and, therefore, economical.

Further advantages and details of the invention are described in the following with reference to the embodiment example shown in the drawing and further objects of the invention can be derived therefrom.

DESCRIPTION OF THE PREFERRED EMBODIMENT EXAMPLES

Figure 1:
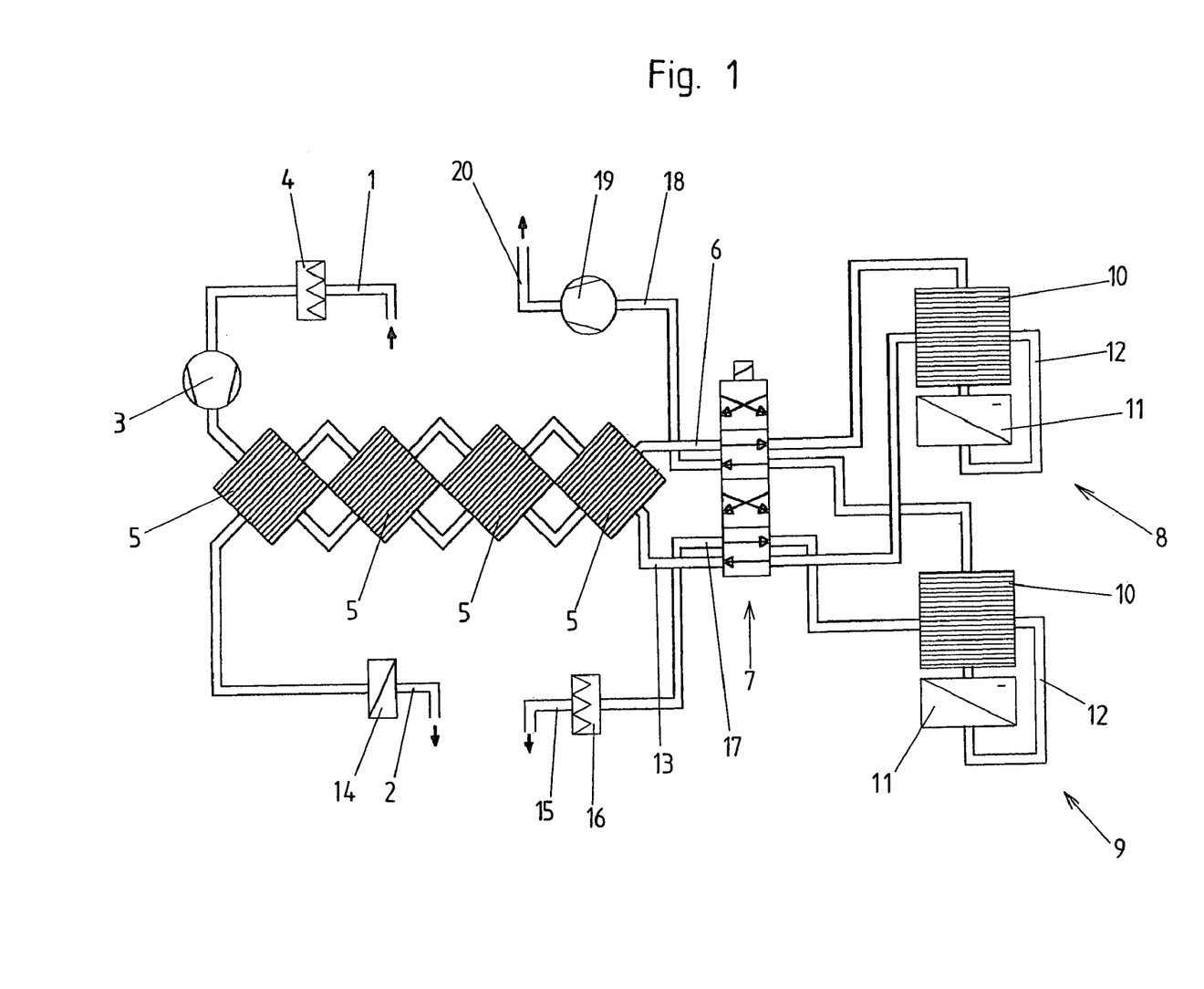
FIG. 1 is a schematic view showing an embodiment example of a drying device according to the invention without the coolant circuit.

An embodiment example of a drying device according to the invention is shown schematically in FIG. 1 without the coolant circuit. The gas to be dried, in particular air, is supplied through a gas input line 1 and, after being dried, flows through a gas output line 2. The gas is guided through the drying device by means of a gas conveyor 3, arranged in the present example in the region of the gas input line 1, in the form of a ventilator or blower. Further, an air filter 4 is arranged in the gas input line 1 in front of the gas conveyor 3. The gas to be dried is guided further through at least one gas-gas heat exchanger 5. Preferably, a plurality of such gas-gas heat exchangers 5 or a multiple-stage gas-gas heat exchanger is provided. An initial cooling of the gas to be dried is carried out in the gas-gas heat exchanger 5, wherein the dew point of the gas to be dried is preferably not yet reached, so that there is still no condensation in the gas-gas heat exchanger. When using the drying device in a closed circuit of a drying plant, this applies at least for continuous operation of the drying plant. For example, the dew point temperature of the gas to be dried in the gas input line 1 in continuous operation is less than $-5°$ C. The temperature of the gas to be dried is preferably in the range of $0°$ C. to $10°$ C. at the output of the final gas-gas heat exchanger 5 located in the region before the split into parallel branches.

The gas flowing through the gas line 6 after passing through the gas-gas heat exchanger 5 is subsequently supplied to one of two parallel cooling branches 8, 9 by means of the switching valve 7. In the position of the switching valve 7 shown in FIG. 1, the gas to be dried is supplied to cooling branch 8. In the respective cooling branch 8, 9, it initially flows through the first channel (passage) of a gas-gas heat exchanger 10 in which it is further cooled. Cooling below the dew point temperature of the gas can already be carried out in the latter so that condensation is formed in the gas-gas heat exchanger 10. Since the temperature of the gas is preferably below $0°$ C., the condensation precipitates as ice in the first channel of the gas-gas heat exchanger 10.

The gas then flows into the first channel of a gas-coolant heat exchanger 11 in which the gas is further cooled. For this purpose, a coolant is guided through the second channel of the gas-coolant heat exchanger 11 by means of a coolant circuit, not shown in FIG. 1. The second channel of the gas-coolant heat exchanger 11 forms the evaporator for the coolant circulating in the coolant circuit. The coolant circuit will be described more fully below with reference to FIG. 2.

The gas has a temperature of $-20°$ C. or less at the output of the gas-coolant heat exchanger 11. Depending on the purpose for which the gas to be dried is used, the temperature at the output of the gas-coolant heat exchanger 11 can also be reduced to $-35°$ C. or less.

In the first channel of the gas-coolant heat exchanger 11, the condensation precipitates as ice.

After exiting the gas-coolant heat exchanger 11, the dried, cooled gas flows through line 12 into the second channel of the gas-gas heat exchanger 10, wherein it undergoes an initial heating. The gas flows on to the switching valve 7 and then into the gas line 13 in which the parallel cooling branches 8, 9 have been combined again by means of the switching valve 7. Subsequently, the gas is further heated in the gas-gas heat exchanger 5 and, after flowing through the gas-gas heat exchanger 5, is supplied to a heater 14 in which it is heated to the desired temperature at which it exits through the gas output line 2.

A respective cooling branch 8, 9 is in its active state when the gas to be dried is guided through it and cooled to the desired minimum temperature. At any given point in time, one of the two cooling circuits 8, 9 is in its active state. In the position of the switching valve 7 shown in FIG. 1, cooling circuit 8 is in its active state. In this sense, the cooling circuits 8, 9 operate in alternating operation or opposing cycles.

In the active state of a respective cooling branch 8, 9, iced condensation is progressively added to the first channel of the gas-coolant heat exchanger 11 and possibly also to the first channel of the gas-gas heat exchanger 10. Therefore, regeneration of this cooling branch 8, 9 is required after a certain period of time. For this purpose, the switching valve 7 is switched and, further, valves in the coolant circuit are switched as will be explained in the following with reference to FIG. 2. The other one of the two cooling branches 8, 9 is then in its active state, while the cooling branch 8, 9 that was previously in its active state is now in its passive state and is regenerated.

In order to regenerate the cooling branch 8, 9 in its passive state, an ambient-air input line 15 is provided through which ambient air can flow in. An air filter 16 is arranged in this ambient-air input line 15. The ambient air flows further through the ambient-air line 17 to the switching valve 7 and passes through the latter into the cooling branch 8, 9 that is in its passive state. In the position of the switching valve 7 shown in FIG. 1, this is cooling branch 9. The ambient air is guided in this cooling branch 8, 9 initially through the second channel of the gas-gas heat exchanger 10 and is further guided via line 12 through the first channel of the gas-coolant heat exchanger 11. Further, the ambient air is guided through the first channel of the gas-gas heat exchanger 10. After exiting the heat exchanger 10, the ambient air is guided to the switching valve 7 and through the latter into the ambient-air line 18. The ambient air is conveyed by means of the subsequent ambient-air conveyor 19 (in the form of a blower or ventilator) and the ambient air is discharged into the atmosphere through the ambient-air output line 20. The ambient-air conveyor 19 accordingly serves to convey the ambient air through the ambient-air input line 15 and the cooling branch 8, 9 that is in its passive state (at least for some of the time during which the cooling branch 8, 9 is in its passive state) and through the ambient-air output line 20.

While the ambient air is guided through the first channel of the gas-coolant heat exchanger 11 of the cooling branch 8, 9 that is in its passive state, it is preferable to guide coolant through the second channel of the gas-coolant heat exchanger 11, wherein the second channel of the gas-coolant heat exchanger 11 forms the condenser of the coolant circuit. Accordingly, heat which occurs in any case in the coolant circuit is fed to the gas-coolant heat exchanger 11 so that an efficient thawing of the latter is achieved. Further, the ambient air flowing through the first channel of the gas-coolant heat exchanger 11 is heated so as to facilitate the thawing of any ice that may be present in the first channel of the gas-gas heat exchanger 10.

The first and second channels of heat exchangers mentioned herein could also be designated, for example, as first and second, or primary and secondary, passages or primary and secondary circuits.

A possible embodiment form of the coolant circuit will be described in the following with reference to FIG. 2. A plurality of valves 21, 21', 22, 22', 23, 23' that are constructed as cutoff valves which can be opened and closed are arranged in the coolant circuit. Valves 21, 21' and 22, 22' form portions of the switching device for switching the cooling branches 8, 9 between their active state and passive state. This switching device also includes the switching valve 7 and a control unit, not shown. In the passive state of a cooling branch 8, 9, the second channel of the gas-coolant heat exchanger 11 located in this cooling branch 8, 9 can be switched on by the valves 23, 23' to operate as a condenser of the coolant circuit.

Figure 2:
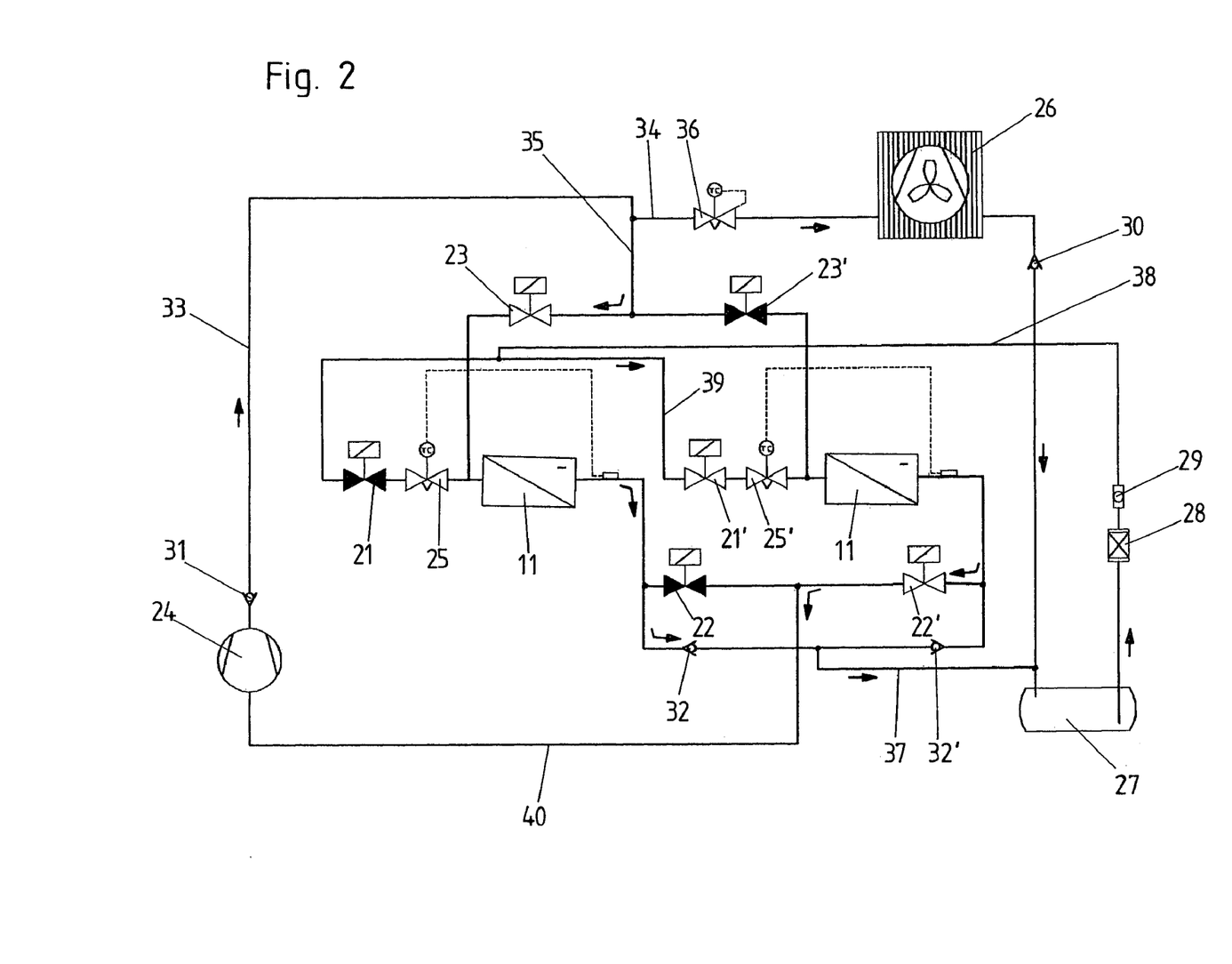
FIG. 2 shows a possible embodiment form of the coolant circuit.

In the determined switching state of the coolant circuit depicted in FIG. 2, a filled in outline of a valve 21, 21', 22, 22', 23, 23' symbolizes the closed state of this valve and an empty outline symbolizes the opened state. The arrows represent the flow direction of the coolant.

Apart from the valves mentioned above, the coolant circuit also comprises a compressor 24, the expansion valves 25, 25' connected upstream of the gas-coolant heat exchanger 11 operating as an evaporator, the separate condenser 26, a pressure regulating valve 36 being connected upstream of the latter, the collecting vessel 27, a dryer filter 28, a sight glass 29, and check valves 30, 31, 32, 32'.

In the switching state shown in FIG. 2, the gas-coolant heat exchanger 11 on the right in FIG. 2 is operated as an evaporator and the cooling branch 8, 9 in which this gas-coolant heat exchanger is arranged is in its active state. The coolant conveyed by the compressor 24 passes through the check valve 31 into line 33 and branches subsequently into lines 34 and 35. The coolant flowing through line 34 passes through the pressure regulating valve 36 into the condenser 26, condenses therein and subsequently passes through the check valve 30 into the collecting vessel 27. The coolant flowing through the line 35 passes through the valve 23 into the second channel of the gas-coolant heat exchanger 11, condenses therein and flows onward through the check valve 32 and line 37 into the collecting vessel 27. The second channel of the gas-coolant heat exchanger 11 on the left in FIG. 2 accordingly works as a condenser in this switching position. The cooling branch 8, 9 in which this gas-coolant heat exchanger 11 is located is regenerated and ambient air is conveyed through this cooling branch 8, 9. After the regeneration is concluded, the through-flow of ambient air can be terminated and the valve 23 can be closed so that the condenser 26 is now the only condenser of the coolant circuit. However, the cooling circuit in question is still in the passive state.

The second channel of the gas-coolant heat exchanger 11 located in the currently active cooling branch 8, 9 is operated as an evaporator of the coolant circuit. Accordingly, by means of the action of the compressor 24, coolant flows from the collecting vessel 27 through the dryer filter 28 and the sight glass 29 and then through the lines 38, 39, the opened valve 21' and the expansion valve 25' into the second channel of the gas-coolant heat exchanger 11, shown at right in FIG. 2, in which it is evaporated. The evaporated coolant is guided through the open valve 22' into the line 40 to the compressor 24.

Shortly before the cooling branches 8, 9 are switched between their active state and passive state, the gas-coolant heat exchanger 11 located in the passive cooling branch 8, 9 can already be cooled. For this purpose, the valves 21, 22 are also opened (valve 23 was already closed at an earlier time) so that both gas-coolant heat exchangers 11 now operate as evaporators.

Subsequently, the cooling branch that was formerly in its active state is switched into its passive state, and vice versa. For this purpose, the switching valve 7 is actuated and the valves 21', 22' are closed (valves 21, 22 must be opened now at the latest; these valves were preferably already opened somewhat earlier as was described). Valve 23 remains closed. In order for the gas-coolant heat exchanger 11 that is located in the passive cooling branch 8, 9 to be operated as an additional condenser (for the duration of regeneration), the valve 23' can be opened for this period of time.

Although the coolant circuit according to FIG. 2 is a preferred embodiment form of the coolant circuit, a modified construction of the coolant circuit is also be conceivable and possible. For example, the possibility of operating the second channels of the gas-coolant heat exchangers 11 as condensers could also be dispensed with so that the condenser 26 would be the only condenser of the coolant circuit. The regeneration of the cooling branch 8, 9 in its passive state could then be carried out without additional heating of the gas-coolant heat exchanger 11 and/or the ambient air could be guided through, or another heating device (for the gas-coolant heat exchanger 11 or the supplied ambient air) could be provided (although this would entail increased expenditure of energy).

It is also conceivable and possible, in principle, to provide a separate coolant circuit for each of the two gas-coolant heat exchangers 11.

The different components of the coolant circuit, for example, the compressor 24, the expansion valves 25, 25', the dryer filter 28 and the sight glass 29 can be constructed in a conventional manner.

In the embodiment example shown herein, a common switching valve 7 is provided, by means of which the gas to be dried and the ambient air conveyed by the ambient-air conveyor 19 are alternately supplied to the two cooling branches 8, 9.

Figure 3:
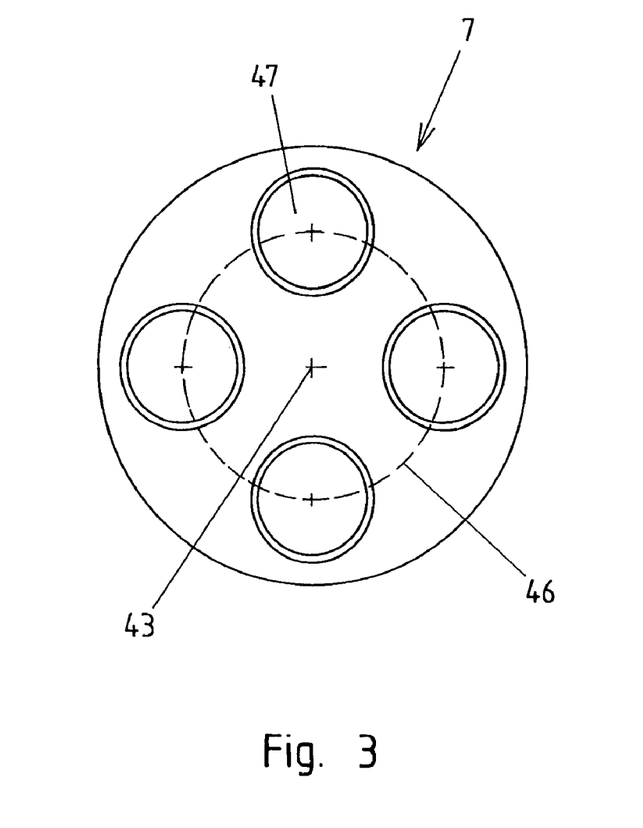
FIG. 3 and FIG. 4 show a front view and a perspective view of a switching valve.
Figure 4:
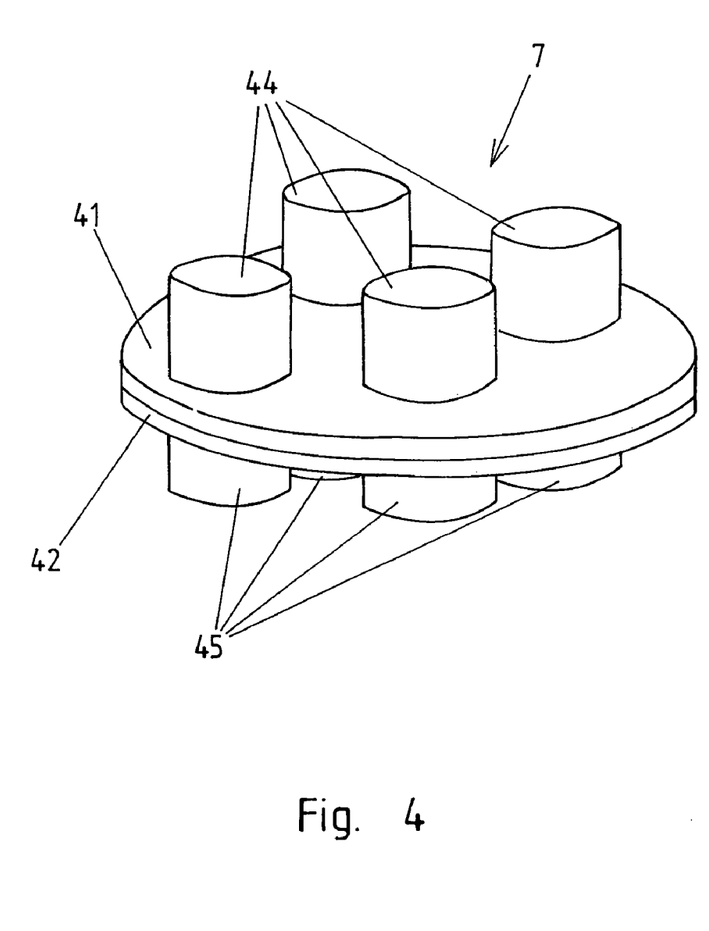

A particularly advantageous embodiment example for the switching valve 7 is shown in FIGS. 3 and 4. The switching valve 7 has a first part and a second part 41, 42, respectively, which are rotatable around an axis of rotation 43. When two parallel cooling branches 8, 9 are provided, each part 41, 42 has four connections 44, 45 that are arranged so as to be uniformly spaced along an imaginary circle 46 around the axis of rotation 43. The connections 44, 45 continue from the through-openings 47 through the first part and second part 41, 42. When the connections 44, 45 or through-openings 47 of the first part and second part 41, 42 are aligned with one another, the through-openings 47 in the two parts 41, 42 are sealed with respect to one another. The lines 6, 18, 17, 13 are connected to the connections, gas lines and ambient-air lines alternate with one another considered in circumferential direction. Input lines and output lines of the two cooling branches 8, 9 are connected to the connections 45 of the second part 42; lines belonging to the different cooling branches 8, 9 are arranged successively in circumferential direction.

In order to switch the switching valve 7 from the position shown in FIG. 1 to the other position that can be occupied by the switching valve 7 according to FIG. 1, the two parts 41, 42 are rotated by 90° relative to one another and the two parts are rotated back again to switch back. The lines connected to the switching valve 7 must accordingly have a certain flexibility, at least on one of the two sides of the valve, in order to make this rotation possible.

Figure 5:
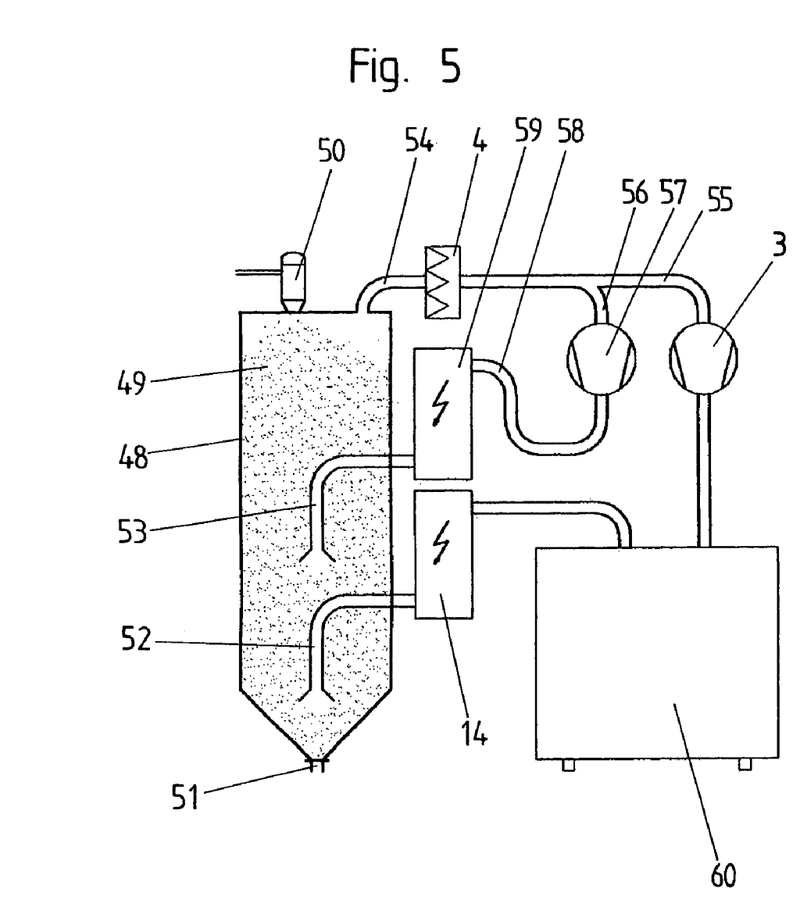
FIG. 5 and FIG. 6 are schematic views showing possible embodiment forms of drying plants with a drying device according to the invention.

FIG. 5 shows an embodiment example of a drying plant in which a drying device according to the invention can be used. The drying plant has a drying vessel 48 for receiving material 49 to be dried. The drying material 49 in this case is bulk material, particularly plastic granulate, which is fed to the drying vessel 48 via a feed device 50, e.g., a suction conveyor. After drying, the material 49 is removed through the take-off opening 51.

In order to dry the material 49, gas is blown into the drying vessel through the blow-in lines 52, 53. Gas, particularly air, that has been dried by means of a drying device according to the invention flows through the blow-in line 52 located closer to the take-off opening 51. The gas which is blown in through the blow-in lines 52, 53 is discharged through the outlet line 54 after flowing through the material 49 in the drying vessel 48. The outlet line 54 proceeds from the drying vessel 48 in the area of its upper end. The outlet line 54 simultaneously forms the gas inlet line of the drying device according to the invention. The gas is guided further through an air filter 4. Subsequently, the gas branches into two gas lines 55, 56 in which it is conveyed by means of a gas conveyor 3, 57. The gas conveyor 57 conveys the gas further through the gas line 58 and the heating device 59 in which the gas is heated again to the desired temperature in order to be blown into the drying vessel 48 through the blow-in line 53. The gas conveyed by the gas conveyor 3 travels through the drying unit 60 and heating device 14 and back into the drying vessel 58 through the blow-in line 52. The drying unit 60 is constructed in the manner according to the invention. For example, it can be constructed in the manner shown in FIGS. 1 and 2 (in which the air filter 4, gas conveyor 3 and heating device 14, shown separately in FIG. 5, are omitted from the unit 60).

Figure 6:
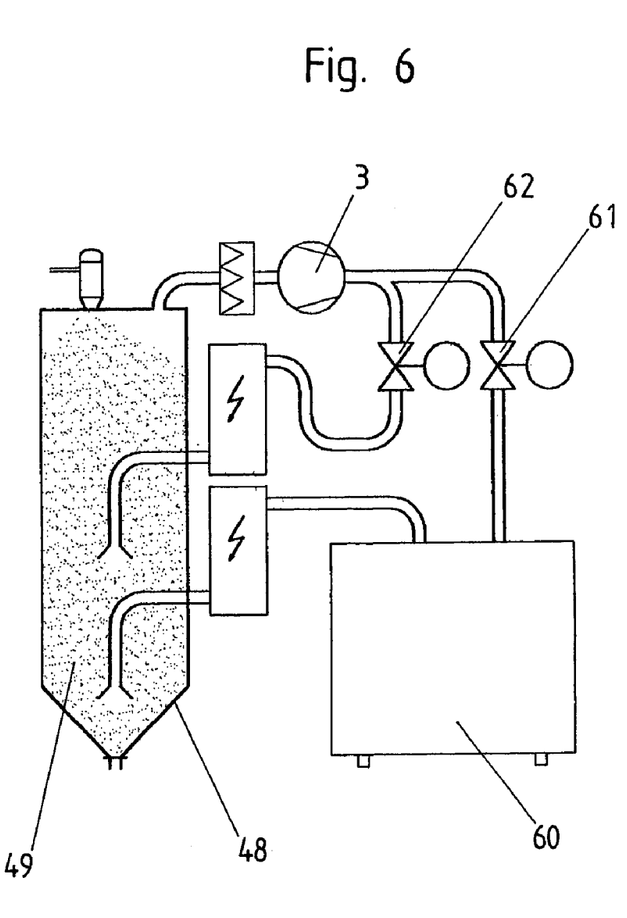

A similar embodiment example of a drying plant is shown in FIG. 6. In this case, however, a common gas conveyor 3 is provided before the branching into the gas lines 55, 56. A throttle valve (or butterfly valve) 61, 62 is arranged in each gas line 55, 56 for regulating the desired splitting of the gas flow into gas lines 55, 56. In other respects, the construction corresponds to that shown in FIG. 5.

During the regeneration of a cooling branch 8, 9, the condensation which is thawed by the ambient air that is blown through can evaporate more or less and be entrained by the ambient air flowing through. Further, outlets can be provided in the gas-coolant heat exchanger and, as the case may be, also in the gas-gas heat exchanger, through which thawed condensation can flow off into a collecting vessel. Outlets of this kind, not shown in the drawings, can have a siphon.

Various modifications of the embodiment examples described in the preceding are conceivable and possible without departing from the field of the invention. Instead of two parallel cooling branches 8, 9 operating in opposing cycles, more than two such branches could also be provided, for example. In this case, at least one of the cooling branches 8, 9 would be in its active state at any given time. Also, a plurality of gas-gas heat exchangers 10 could also be arranged successively in the individual cooling branches 8, 9 (analogous to the successive arrangement of the gas-gas heat exchangers 5). The ambient-air conveyor 19 could also be arranged in the area of the ambient-air output line 20, for example.

As follows from the preceding description, the field of the invention is not limited to the embodiment examples shown herein, but rather should be defined with reference to the appended claims together with their full range of possible equivalents.

While the preceding description and drawings show the invention, it is obvious to the person skilled in the art that various modifications can be carried out without departing from the spirit of and field of the invention.

| Reference Numbers: | |
|---|---|
| 1 | gas input line |
| 2 | gas output line |
| 3 | gas conveyor |
| 4 | air filter |
| 5 | gas-gas heat exchanger |
| 6 | gas line |
| 7 | switching valve |
| 8 | cooling branch |
| 9 | cooling branch |
| 10 | gas-gas heat exchanger |
| 11 | gas-coolant heat exchanger |
| 12 | line |
| 13 | gas line |
| 14 | heating device |
| 15 | ambient-air input line |
| 16 | air filter |
| 17 | ambient-air line |
| 18 | ambient-air line |
| 19 | ambient-air conveyor |
| 20 | ambient-air output line |
| 21, 21' | valve |
| 22, 22' | valve |
| 23, 23' | valve |
| 24 | compressor |
| 25, 25' | expansion valve |

-continued

| Reference Numbers: | |
|---|---|
| 26 | condenser |
| 27 | collecting vessel |
| 28 | drying filter |
| 29 | sight glass |
| 30 | check valve |
| 31 | check valve |
| 32, 32' | check valve |
| 33 | line |
| 34 | line |
| 35 | line |
| 36 | pressure regulating valve |
| 37 | line |
| 38 | line |
| 39 | line |
| 40 | line |
| 41 | first part |
| 42 | second part |
| 43 | axis of rotation |
| 44 | connection |
| 45 | connection |
| 46 | circle |
| 47 | through-opening |
| 48 | drying vessel |
| 49 | material |
| 50 | feed device |
| 51 | take-off opening |
| 52 | blow-in line |
| 53 | blow-in line |
| 54 | outlet line |
| 55 | gas line |
| 56 | gas line |
| 57 | gas conveyor |
| 58 | gas line |
| 59 | heating device |
| 60 | drying unit |
| 61 | throttle valve |
| 62 | throttle valve |

What is claimed is:

1. A drying device for drying a gas, comprising:
a gas input line for supplying the gas to be dried;
a gas output line for discharging the dried gas;
parallel cooling branches which can be switched by a switching device between an active state, in which the gas to be dried flows through the cooling branch and cold-drying of the gas is carried out in the cooling branch, and a passive state;
wherein at least one of the cooling branches is in its active state at a given time; and
a gas-coolant heat exchanger being arranged in each of the cooling branches having a first channel through which the gas to be dried flows in the active state of this cooling branch and a second channel which, in the active state of this cooling branch, forms an evaporator for a coolant circulating in at least one coolant circuit;
an ambient-air input line;
an ambient-air output line; and
an ambient-air conveyor;
wherein in the passive state of a respective cooling branch the ambient-air input line and the ambient-air output line are connected, at least for a time, with this cooling branch by said switching device; and
said ambient-air conveyor conveying ambient air through the first channel of the gas-coolant heat exchanger arranged in this cooling branch.

2. The drying device according to claim 1, wherein at least one gas-gas heat exchanger is arranged in the cooling branches and has a first channel through which the gas to be dried is guided before being guided through the first channel of the gas-coolant heat exchanger and a second channel through which the gas to be dried is guided after being guided through the first channel of the gas-coolant heat exchanger.

3. The drying device according to claim 1, wherein the drying device comprises at least one gas-gas heat exchanger having a first channel through which the gas to be dried is guided before being guided through one of the cooling branches and a second channel through which the gas to be dried is guided after being guided through one of the cooling branches.

4. The drying device according to claim 1, wherein the ambient-air conveyor is arranged in the area of the ambient-air input line or ambient-air output line.

5. The drying device according to claim 1, wherein the drying device comprises a gas conveyor for guiding the gas to be dried through the drying device.

6. The drying device according to claim 5, wherein the gas conveyor is arranged in the area of the gas input line.

7. The drying device according to claim 1, wherein the drying device has a heater arranged in the area of the gas output line for additional heating of the dried gas.

8. The drying device according to claim 1, wherein, in the passive state of a respective cooling branch, the second channel of the gas-coolant heat exchanger of this cooling branch forms a condenser for the coolant circulating in at least one coolant circuit.

9. The drying device according to claim 8, wherein the coolant circuit has another condenser.

10. The drying device according to claim 1, wherein, in the passive state of a respective cooling branch, ambient air conveyed through the cooling branch by the ambient-air conveyor flows through the cooling branch in a flow direction opposed to the flow direction of the gas to be dried that is conveyed through the cooling branch in the active state of the cooling branch.

11. The drying device according to claim 1, wherein the switching device has a common switching valve for alternately guiding the gas to be dried and the ambient air conveyed by the ambient-air conveyor through the two cooling branches.

12. The drying device according to claim 1, wherein the switching valve comprises a first part and a second part which are rotatable relative to one another around an axis of rotation, wherein an equal number of at least four connections are arranged at the first part and at the second part along an imaginary circle around the axis of rotation so as to be equidistant from one another in circumferential direction of the circle and are continued from through-openings extending parallel to the axis of rotation through the first part and second part, wherein the first part and the second part are sealed relative to one another in regions around the through-openings.

13. The drying device according to claim 1, wherein only one coolant circuit is provided and wherein the coolant can be guided through the second channel of the gas-coolant heat exchanger in its active state by the switching valves and the first channel of this gas-coolant heat exchanger forms the evaporator of the coolant circuit and an expansion valve is connected, respectively, upstream of the latter.

14. The drying device according to claim 13, wherein switching valves are further provided in the coolant circuit, and at least a portion of the coolant can be guided by these switching valves through the second channel of the gas-coolant heat exchanger which is arranged in at least one cooling branch in its passive state.

15. The drying device according to claim 1, wherein the gas is guided in a circuit through a drying vessel of a drying plant, which drying vessel receives the material to be dried.

16. A method for drying a gas which is supplied through a gas input line and which is discharged through a gas output line after drying and which is guided alternately through one of at least two parallel cooling branches for cold-drying, comprising the steps of:
  guiding the gas to be dried in the cooling branch and, in so doing, cold-dried, the cooling branch being in its active state and the at least one other cooling branch being in its passive state;
  arranging a coolant heat exchanger in each of the cooling branches, which gas-coolant heat exchanger has a first channel through which the gas to be dried is guided in the active state of this cooling branch and a second channel which is operated in the active state of this cooling branch as an evaporator for a coolant circulating in at least one coolant circuit;
  guiding ambient air through the at least one cooling branch in its passive state, at least for part of the duration of the passive state, by an ambient-air conveyor;
  supplying said ambient air to the cooling branch via an ambient-air input line; and
  discharging said ambient air from the cooling branch via an ambient-air output line.

17. The method according to claim 16, wherein the switching between the active state and passive state of the cooling branches is carried out by a switching device comprising at least one switching valve, by which the gas to be dried and the ambient air conveyed by the ambient-air conveyor are alternately guided through the two cooling branches.

18. The method according to claim 16, wherein, at least for part of the time during which a cooling branch is in its passive state, the second channel of the gas-coolant heat exchanger of this cooling branch is operated as a condenser of the at least one coolant circuit.

19. The method according to claim 16, wherein the gas to be dried is guided in a circuit through a drying vessel of a drying plant, which drying vessel receives the material to be dried.

* * * * *